United States Patent [19]

Walker et al.

[11] Patent Number: 4,799,576
[45] Date of Patent: Jan. 24, 1989

[54] PROTECTIVE DEVICE TO PREVENT PROJECTION OF A HEAVY COILED SPRING AWAY FROM AN AIR BRAKE HOUSING

[75] Inventors: Timothy D. Walker, Wilkesboro; Steven A. Dancy, Millers Creek, both of N.C.

[73] Assignee: Carl Livingston Dancy, Sr., Millers Creek, N.C.

[21] Appl. No.: 68,624

[22] Filed: Jun. 30, 1987

[51] Int. Cl.$^4$ .......................... F16D 63/00; F16F 9/00; F16F 1/06; F01B 19/00
[52] U.S. Cl. .......................................... 188/84; 92/94; 188/170; 188/382; 267/174; 267/182; 403/11; 403/23
[58] Field of Search ................... 188/84, 106 F, 106 P, 188/166–169, 151 R, 151 A, 361, 382, 72.1, 72.3, 72.4, 170; 267/170, 174, 182; 280/1, 153 R, 154, 727, 754, 770; 303/68; 180/271, 313; 92/94, 169, 170, 64; 192/88 A, 88 B; 403/11, 23

[56] References Cited

U.S. PATENT DOCUMENTS 2,605,119  7/1952  Earnest ........................... 280/153 R
3,926,094 12/1975  Kuricmh et al. ............... 188/170 X Primary Examiner—Andres Kashnikow
Assistant Examiner—Robert J. Oberleitner
Attorney, Agent, or Firm—Bell, Seltzer, Park & Gibson

[57] ABSTRACT

A protective device for use on a wheeled vehicle such as a tractor pulled trailer equipped with an air brake is provided. The air brake includes a housing generally disposed lengthwise of the trailer and comprises a transversely disposed diaphragm in a medial portion thereof with air pressure communicating with the front side of the diaphragm and further comprises a heavy coiled spring positioned in opposition to the air pressure on the rear side of the diaphragm. A protective device in the form of a perforated plate is mounted adjacent to and rearwardly of the housing so as to be in the path of the coiled spring in the event of rupturing of the housing, as from corrosion, and releasement of the spring therefrom, to prevent the spring from being projected rearwardly away from the housing.

6 Claims, 1 Drawing Sheet

PROTECTIVE DEVICE TO PREVENT PROJECTION OF A HEAVY COILED SPRING AWAY FROM AN AIR BRAKE HOUSING

FIELD OF THE INVENTION

The present invention relates to a protective device mounted rearwardly of an air brake housing having a diaphragm and a heavy coiled spring therein so as to be in the path of the spring in event of the housing rupturing as from corrosion and allowing releasement of the spring away from the housing.

BACKGROUND OF THE INVENTION

Heavy vehicles such as tractor trailers utilize air brakes as the principle means of stopping. These air brake systems generally comprise a service brake utilizing compressed air to actuate the brake mechanism and a spring brake mounted behind the air brake which is actuated mechanically. The spring brake employs a heavy coil spring and functions as an emergency brake anytime there is a loss of air pressure in the service brake. Additionally, the spring brake is a parking brake when the vehicle is stationary.

A problem associated with spring brakes is that the brake assembly being on the underside of a tractor trailer is exposed to harsh weather and road conditions such as snow and salt which results in corrosion of the housing. Such corrosion is severe enough to cause the spring housing to rupture, thereby permitting the spring to be released from the housing. When this occurs, the heavy coiled spring has been known to become a dangerous projectile released from the rear of the vehicle, endangering anything and anyone behind the vehicle. This dangerous situation has been described in a Modern Truck journal article entitled "Coiled Menace A Threat To Highway Safety!" (May 1983) wherein the problem associated with the releasement of spring brakes is discussed. However, the only suggestion for obviating this problem is to periodically check the brake housing for corrosion and to periodically replace the entire housing to avoid the possibility of the housing corroding; but, this is impractical and expensive to do.

SUMMARY OF THE INVENTION

In accordance with the present invention, applicant provides a protective device for a wheeled vehicle such as a tractor pulled trailer which prevents the projection of a heavy coiled spring of an air brake rearwardly away therefrom. To this end, a protective device is mounted rearwardly of the air brake. The air brake has an elongate housing containing a diaphragm with air pressure communicating with the front side of the diaphragm and further includes a heavy coiled spring positioned in opposition to the air pressure on the rear side of the diaphragm. The protective device is mounted rearwardly of and adjacent to the housing so as to be in the path of the coiled spring in the event of rupturing of the housing such as from corrosion, thereby preventing the spring from being projected rearwardly away from the housing.

BRIEF DESCRIPTION OF THE DRAWINGS

The foregoing and other objects, features and advantages of the present invention will be made apparent from the following detailed description of the preferred embodiment of the invention, and from the drawings, in which.

DETAILED DESCRIPTION OF THE INVENTION

Figure 1:
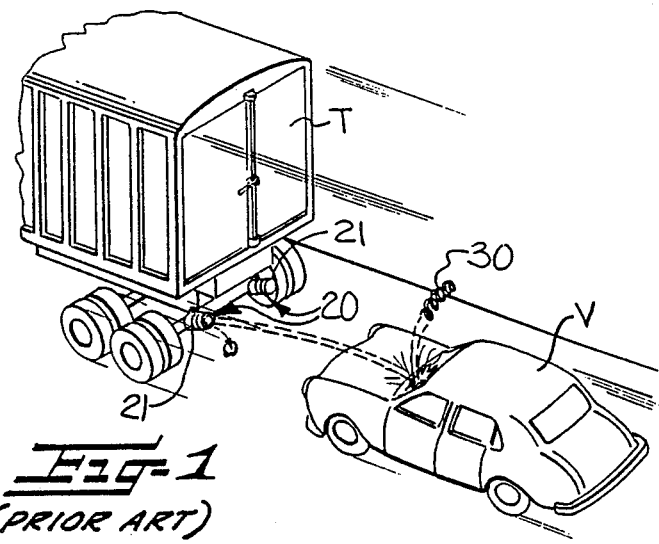
FIG. 1 is a perspective view of a tractor pulled trailer and an automobile illustrating the danger involved with the releasement of the heavy coiled spring rearwardly away from the trailer.
Figure 2:
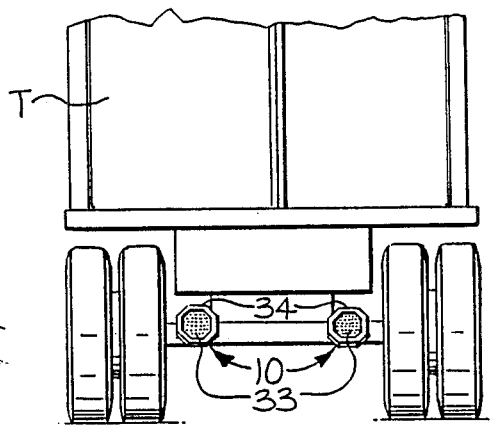
FIG. 2 is a rear view of a tractor pulled trailer with the protective device mounted thereon.
Figure 3:
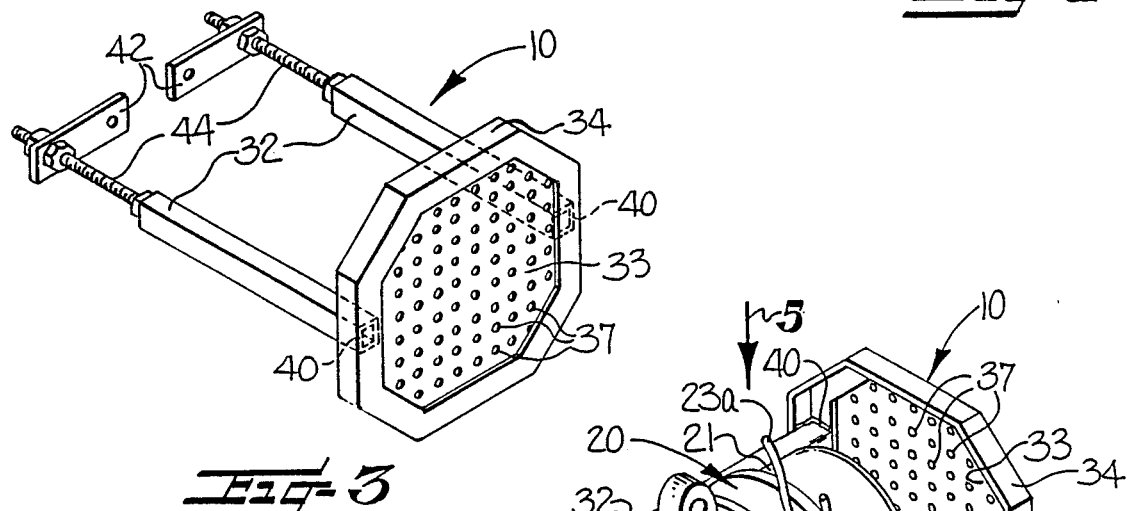
FIG. 3 is a perspective view of the protective device removed from the vehicle.
Figure 4:
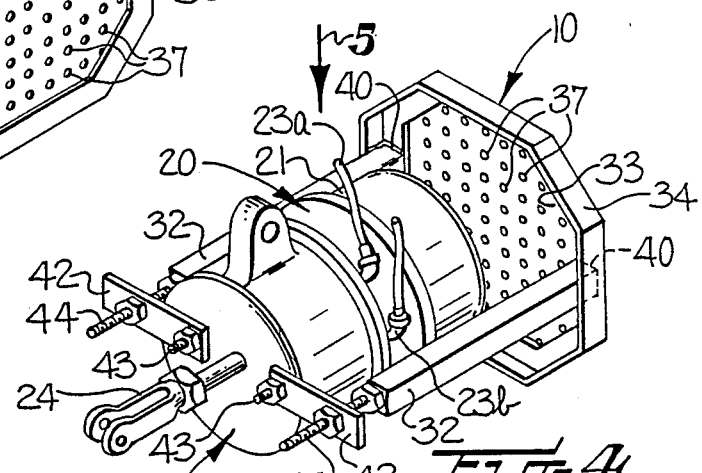
FIG. 4 is a perspective view of the protective device and air brake housing removed from the vehicle.

A protective device mounted rearwardly of and adjacent to the housing of an air brake of a tractor pulled trailer is illustrated in the drawings. This device provides protection against the dangerous projection of the heavy coiled spring of the air brake away from the rear of the trailer T and into the path of vehicles V following behind the truck.

Referring to the Figures, the specific construction of the present invention is illustrated by a representative device generally indicated by the reference numeral 10. The protective device 10 is mounted rearwardly of and adjacent to an air brake assembly 20. The air brake assembly includes an elongate housing 21 generally disposed lengthwise of the trailer and containing a transversely disposed diaphragm 22 in a medial portion thereof with air pressure communicating with the front side of the diaphragm 22 at ports 23a, 23b. The diaphragm 22 actuates a push rod 24 which is attached to the brake linkage. The push rod 24 is axially movable to engage the brakes when moved outwardly and to disengage the brakes when moved inwardly. The push rod 24 and diaphragm 22 are biased by a heavy coiled spring 30.

Figure 5:
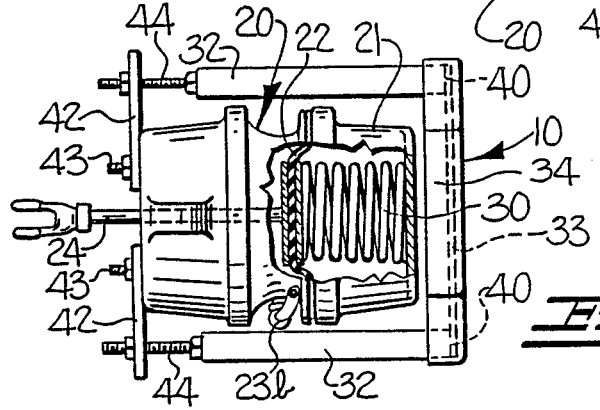
FIG. 5 is a top plan view looking in the direction of arrow 5 in FIG. 4 with parts broken away to show the spring and diaphragm.

Referring to the cutaway portions of FIG. 5, it is this biasing heavy coiled spring 30 which can be accidently released in the event of rupturing of the housing 21. The housing 21 typically ruptures due to corrosion of the metal of the housing 21 caused by the severe road and weather conditions a tractor pulled trailer encounters on the road, namely snow, rain and salt. Once the housing 21 ruptures, it does not take much force such as from hitting a bump or pothole to cause the coiled spring 30 to be released. This releasement often permits the spring 30 to be projected rearwardly away from the truck into the path of another vehicle following behind the truck. This is quite dangerous inasmuch as a heavy spring being projected away from a truck going fifty-five miles per hour will strike an object with a large amount of force and can cause significant damage such as shattering the windshield of a following vehicle resulting in the driver losing control of the vehicle.

The protective device 10 is mounted adjacent and rearwardly of the housing 21 so as to be in the path of the coiled spring 30. The protective device includes a transversely disposed body portion formed of a metal plate 33. The metal plate 33 has a flange 34 which extends forwardly of the plate 33 toward the housing 21. The metal plate 33 typically has a cross-sectional area larger than the housing 21 and preferably has apertures 37 substantially throughout so as to reduce the wind resistance of the body portion when the vehicle is in motion.

The protective device 10 is mounted on the housing 21 utilizing parallel elongate mounting arms 32 extending alongside of opposite sides of the plate 33 and having first ends 40 suitably connected as by welding to the plate 33 and mounting brackets 42 connected to frontal portions of the housing 21 and to second ends of the mounting arms. The mounting brackets 42 may be attached to the housing utilizing the mounting studs 43 already employed to hold the housing 21 in place. Additionally, the mounting arms 32 may include adjustable bolts 44 so as to facilitate changing the distance between the protective device 10 and the housing 21 in order to enable the protective device to be adapted to fit a plurality of wheeled vehicles having different sized springs.

In the drawings and specification, there has been disclosed a preferred embodiment of the invention and, although specific terms are employed, they are used in a generic and descriptive sense only and not for purposes of limitation, the scope of the invention being set forth in the following claims.

That which is claimed is:

1. In a wheeled vehicle such as a tractor pulled trailer equipped with an air brake having an elongate housing generally disposed lengthwise of the trailer and containing a transversely disposed diaphragm in a medial portion thereof with air pressure communicating with the front side of the diaphragm and a heavy coiled spring positioned in opposition to the air pressure on the rear side of the diaphragm, the combination therewith of a protective device mounted adjacent to and rearwardly of said housing so as to be in the path of said coiled spring in the event of rupturing of the housing, as from corrosion, and releasement of the spring therefrom, to prevent the spring from being projected rearwardly away from the housing, and wherein said protective device includes a transversely disposed body portion and mounting means extending alongside of opposite sides of said body portion.

2. In a wheeled vehicle according to claim 1 wherein said mounting means includes a means for securing the body portion to said housing.

3. In a wheeled vehicle according to claim 1 wherein said body portion comprises a metal plate having a flange extending forwardly of the plate towards said housing.

4. In a wheeled vehicle according to claim 1 wherein said body portion is a metal plate having a plurality of apertures substantially throughout so as to reduce the wind resistance of the body portion when the vehicle is in motion.

5. In a wheeled vehicle such as a tractor pulled trailer equipped with an air brake having an elongate housing generally disposed lengthwise of the trailer and containing a transversely disposed diaphragm in a medial portion thereof with air pressure communicating with the front side of the diaphragm and a heavy coiled spring positioned in opposition to the air pressure on the rear side of the diaphragm, the combination therewith of a protective device mounted adjacent and rearwardly of said housing so as to be in the path of said coiled spring in the event of rupturing of the housing, as from corrosion, and releasement of the spring therefrom, to prevent the spring from being projected rearwardly away from the housing, said protective device comprising a transversely disposed body portion formed of a metal plate having perforations substantially throughout the plate, said body portion having a cross-sectional area larger than said housing, parallel elongate mounting arms extending alongside of opposite sides of said plate and having first ends connected to said plate, and mounting brackets connected to frontal portions of said housing and to second ends of said arms for mounting the protective device on the housing.

6. In a wheeled vehicle according to claim 5 wherein said mounting arms are adjustable so as to facilitate changing the distance between said body portion and said housing to enable the protective device to be adapted to a plurality of wheeled vehicles having different length and size air brake housings.

* * * * *